United States Patent
Permuy Dobarro

(10) Patent No.: US 9,939,199 B2
(45) Date of Patent: Apr. 10, 2018

(54) MULTIPLE PRODUCT BELT DRIER FOR DRYING PASTY AND/OR POWDERY MATERIALS, PARTICULARLY FOR DRYING SLUDGES FROM TREATMENT PLANTS OR BIOMASS

(71) Applicant: AQUALOGY DEVELOPMENT NETWORK, S.A., Madrid (ES)

(72) Inventor: Juan Permuy Dobarro, Benicassim (ES)

(73) Assignee: Sociedad General de Aguas de Barcelona, S.A., Barcelona (ES)

( * ) Notice: Subject to any disclaimer, the term of this patent is extended or adjusted under 35 U.S.C. 154(b) by 584 days.

(21) Appl. No.: 14/391,797

(22) PCT Filed: Apr. 10, 2013

(86) PCT No.: PCT/ES2013/070228
§ 371 (c)(1),
(2) Date: Oct. 10, 2014

(87) PCT Pub. No.: WO2013/153248
PCT Pub. Date: Oct. 17, 2013

(65) Prior Publication Data
US 2015/0075024 A1    Mar. 19, 2015

(30) Foreign Application Priority Data

Apr. 13, 2012 (EP) ..................... 12382143

(51) Int. Cl.
*F26B 25/00* (2006.01)
*F26B 21/00* (2006.01)
(Continued)

(52) U.S. Cl.
CPC .......... *F26B 25/001* (2013.01); *C02F 11/123* (2013.01); *F26B 3/06* (2013.01);
(Continued)

(58) Field of Classification Search
CPC ........ F26B 25/001; F26B 21/004; F26B 3/06; F26B 17/08; F26B 21/02; F26B 2200/18;
(Continued)

(56) References Cited

U.S. PATENT DOCUMENTS 1,976,280 A     10/1934  Fischer
3,010,802 A *  11/1961  Schenk .................... B01J 19/18
                                                            23/293 R
(Continued)

FOREIGN PATENT DOCUMENTS

CH         300 111 A       7/1954
DE      40 22 702 C1      11/1991
(Continued)

OTHER PUBLICATIONS

International Search Report of PCT/ES2013/070228 dated Aug. 28, 2013 [PCT/ISA/210].
European Search Report of EP 12 38 2143 dated Jan. 16, 2013.

*Primary Examiner* — Jessica Yuen
(74) *Attorney, Agent, or Firm* — Sughrue Mion, PLLC

(57) ABSTRACT

A multiple product belt drier having a first air permeable conveyor belt on which the materials to be dried are poured to form a first drying path; at least a second air permeable conveyor belt to assure at least a second drying path for drying the materials after the first one; an air blowing mechanism; an air heating mechanism for heating the blown air to dry the materials, and a drying air distribution circuit for distributing the drying air towards the materials and the belts; the drying air circuit being provided so that the drying air circulates downwards through the materials to be dried and the belts, and an air reheating mechanism is provided between the two paths to reheat the air which has passed through the layer of materials on the first belt, before it passes through the layer of materials on the second belt.

18 Claims, 3 Drawing Sheets

(51) Int. Cl.
*F26B 3/06* (2006.01)
*F26B 17/08* (2006.01)
*F26B 21/02* (2006.01)
*C02F 11/12* (2006.01)

(52) U.S. Cl.
CPC ............ *F26B 17/08* (2013.01); *F26B 21/004* (2013.01); *F26B 21/02* (2013.01); *C02F 11/121* (2013.01); *C02F 2303/26* (2013.01); *F26B 25/002* (2013.01); *F26B 2200/18* (2013.01)

(58) Field of Classification Search
CPC .. F26B 25/002; C02F 11/123; C02F 2303/26; C02F 11/121
See application file for complete search history.

(56) References Cited

U.S. PATENT DOCUMENTS

| | | | |
|---|---|---|---|
| 3,143,398 A | | 8/1964 | Swarthout |
| 3,441,258 A | * | 4/1969 | Gieskieng ............. F27B 7/2016 34/368 |
| 5,343,632 A | * | 9/1994 | Dinh .................... F26B 21/086 34/507 |
| 5,428,904 A | * | 7/1995 | Rutz ..................... F26B 21/083 34/219 |
| 6,739,072 B2 | | 5/2004 | Knoer et al. |
| 2009/0315228 A1 | * | 12/2009 | Pasquinet ............. C21D 1/767 266/44 |

FOREIGN PATENT DOCUMENTS

| | | | |
|---|---|---|---|
| EP | 0 356 388 A2 | | 2/1990 |
| EP | 0 528 227 A1 | | 2/1993 |
| EP | 0 570 970 A1 | | 11/1993 |
| FR | 1 076 293 A | | 10/1954 |
| FR | 2 954 814 A1 | | 7/2011 |
| GB | 265 374 A | | 2/1927 |
| GB | 305979 A | * | 2/1930 ............. F26B 17/08 |
| GB | 2 011 597 A | | 7/1979 |
| WO | 01/58815 A2 | | 8/2001 |
| WO | 2007/013819 A1 | | 2/2007 |

* cited by examiner

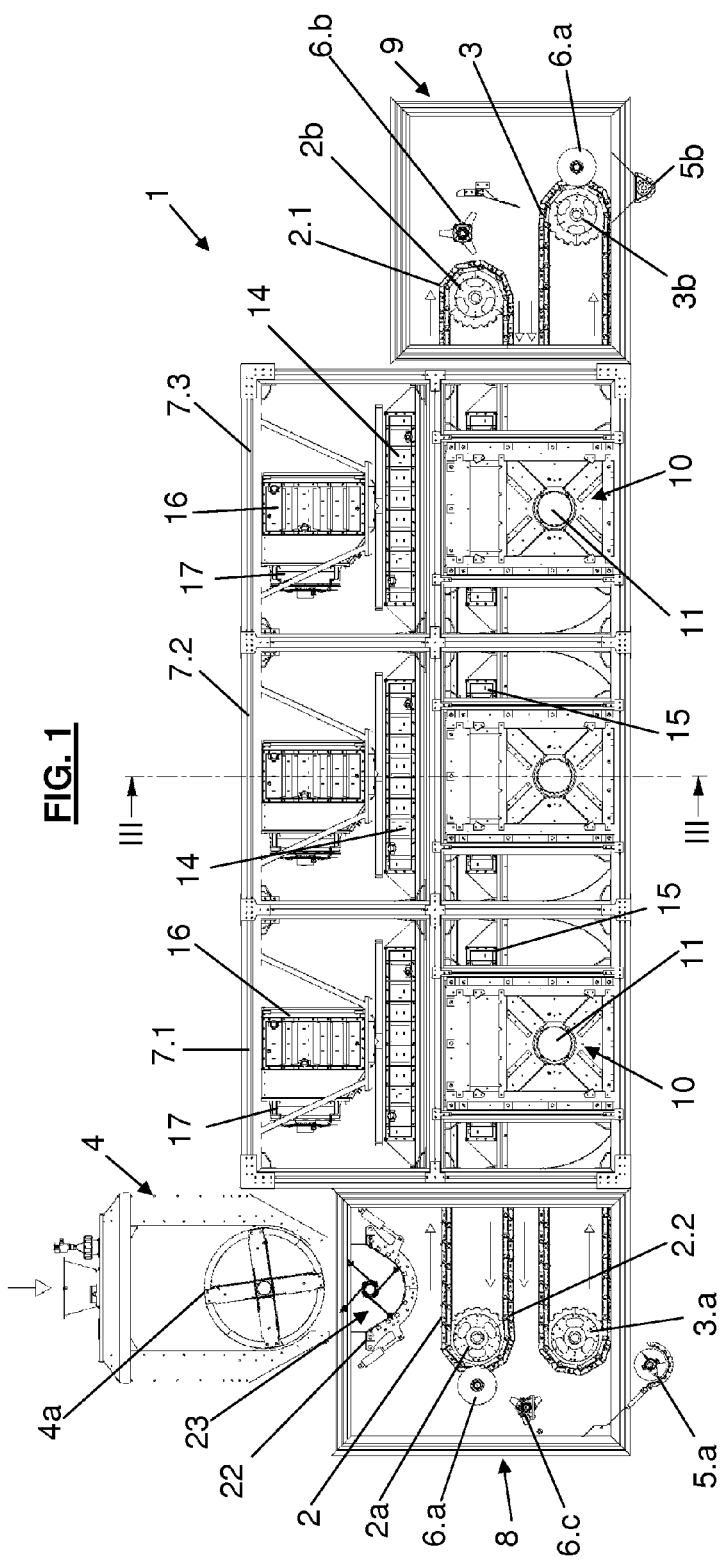
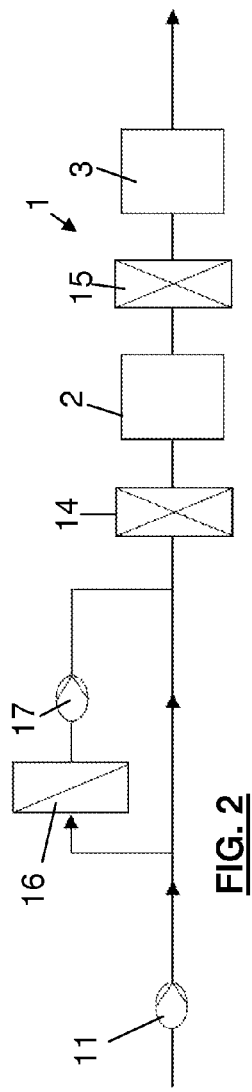
FIG. 1
FIG. 2

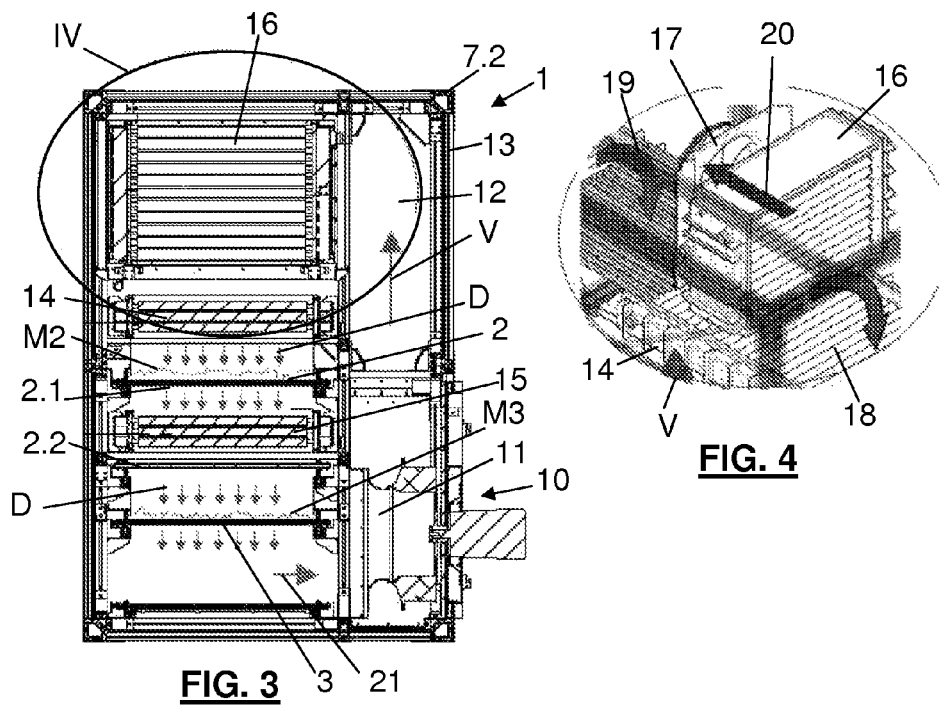
FIG. 3
FIG. 4
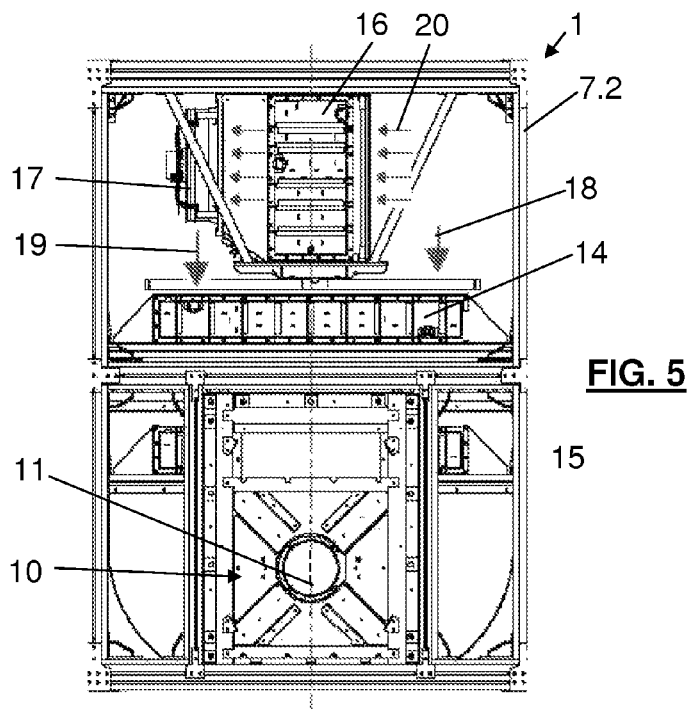
FIG. 5

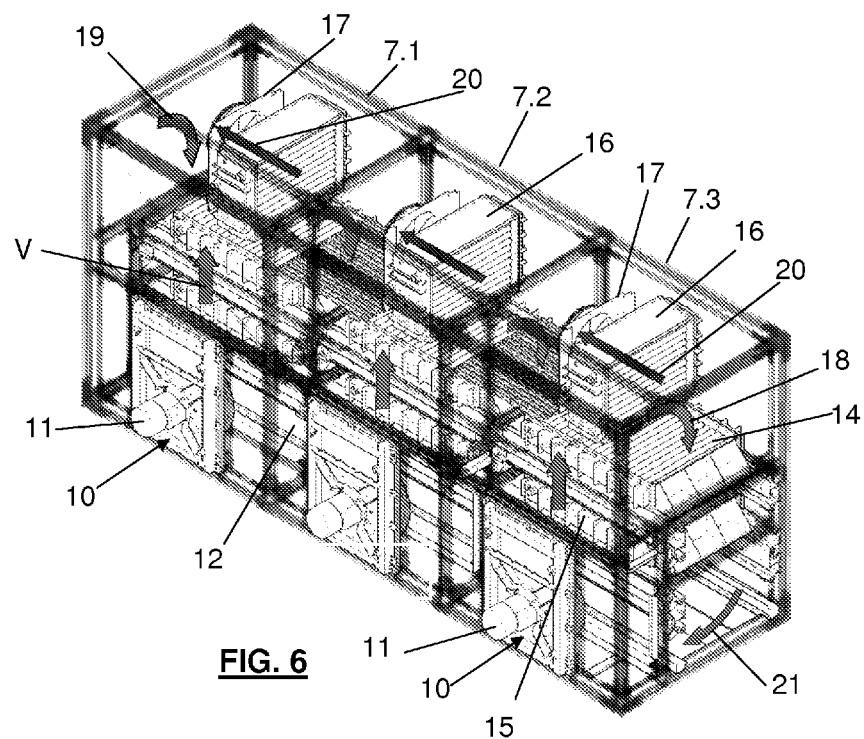
FIG. 6
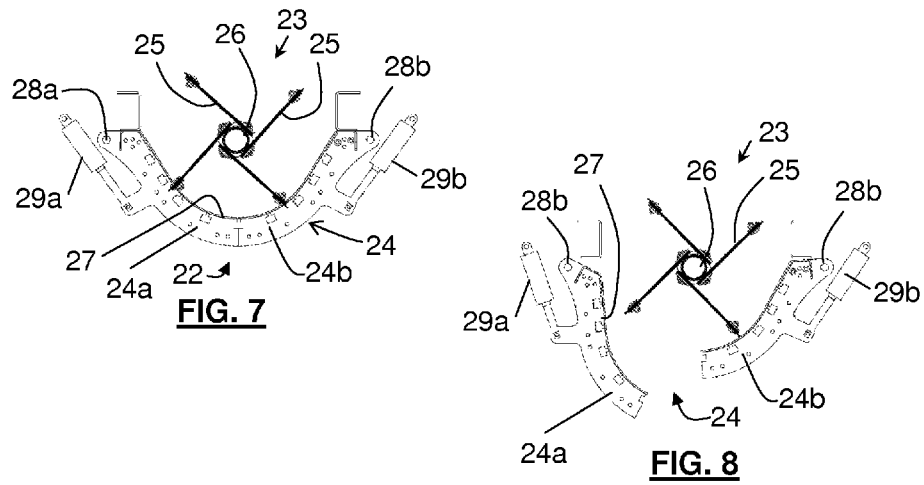
FIG. 7
FIG. 8

MULTIPLE PRODUCT BELT DRIER FOR DRYING PASTY AND/OR POWDERY MATERIALS, PARTICULARLY FOR DRYING SLUDGES FROM TREATMENT PLANTS OR BIOMASS

CROSS REFERENCE TO RELATED APPLICATIONS

This application is a National Stage of International Application No. PCT/ES2013/070228, filed Apr. 10, 2013, claiming priority based on European Patent Application No. 12382143.1, filed Apr. 13, 2012, the contents of all of which are incorporated herein by reference in their entirety.

TECHNICAL FIELD OF THE INVENTION

The invention relates to a multiple product belt drier for drying pasty and/or powdery materials containing water to be evaporated, particularly for sludges from urban or industrial waste water treatment plants, sludges from methanisation, by-products from industrial processes and others and biomass of any type.

The drier is a low temperature drier, i.e., it dries at an air temperature below 95° C., preferably below or equal to 85° C.

BACKGROUND OF THE INVENTION

The patent document EP 0570970 discloses a drier comprising an upper conveyor belt that unloads by gravity the product to be dried on a lower conveyor belt, the drier using an upward air flow for the drying of the products conveyed by the belts. This document recommends forcing the air circulation upwards for reducing the quantity of powder or suspended particles dragged by the air flow.

This drier comprises reheating means for reheating the used air, means towards which the air is conducted after going through the lower belt and means through which the air is forced to circulate before being redirected towards the upper belt.

OBJECTIVES OF THE INVENTION

The main objective of the invention is to provide a belt drier for thermal drying by means of air convection assuring good drying energy efficiency with minimum powder entrainment by the drying air.

The invention also seeks to provide a thermal belt drier for drying by means of air convection which allows treating urban or industrial sludges from treatment plants, sludges from methanisation, by-products from industrial processes and others, and biomass in one and the same equipment.

It is also of interest to have a thermal drier which provides an efficient use of the consumed energy for the air heating and for its circulation.

DISCLOSURE OF THE INVENTION

According to the invention, a multiple product belt drier for drying pasty or powdery materials containing water to be evaporated, particularly for sludges from waste water treatment plants, sludges from methanisation, biomass, comprises:

a first air permeable conveyor belt on which the materials to be dried are poured to form a first drying path;

at least a second air permeable conveyor belt to assure at least a second drying path for drying the materials after the first one;

air blowing means;

air heating means for heating the blown air to dry the materials, and a drying air distribution circuit for distributing the drying air towards the materials and the belts, essentially characterised in that the drying air circuit is provided so that the drying air circulates downwards through the dried materials and the belts, and in that air reheating means are provided between the two paths to reheat the air which has passed through the layer of materials on the first belt, before it passes through the layer of materials on the second belt.

The downward circulation of air reduces the risk of entraining powder which is stopped by the belts acting as filters. Reheating the air which, in a first step, has passed through the damper materials supported by the first belt allows improving the treatment of drier product supported by the second conveyor belt. The air preferably circulates in a direction transverse to the forward movement of the belts.

The second belt is arranged under the first belt the air circuit being provided to assure an air course according to a direction considerably perpendicular to the belts.

The belts are endless belts wound around rollers with horizontal parallel axes, each endless loop having an upper branch and a lower branch, and the reheating means are arranged between the branches of the first belt.

The air blowing means are advantageously adjustable according to the nature of the materials to be dried to control the head loss in the course. The blowing means can comprise at least one radial fan driven by an adjustable speed motor.

The speed of the fans can be adjusted with the aid of speed variators to assure one and the same speed of air passage through the materials and the belts, despite the differences in differential pressure generated by different products, and despite the variation of differential pressure due to specific products during the drying process. This allows assuring an automatic adaptation to multiple products and an optimisation of ventilation electric power consumption.

The air heating means are advantageously located above the first belt, and air cooling means for cooling the air which has passed through the second belt are arranged above the heating means so that part of the recirculated air passes through them, and to assure condensation of part of the evaporated water. One or several axial fans with a horizontal axis of rotation can be arranged on one side of the cooling exchanger to control the airflow passing through this exchanger.

According to this particular embodiment, part of the air which has passed through the second belt, and which is recirculated so that it passes over the first belt, passes through at least one variable speed cooling exchanger, so that this part of the air is cooled to its dew point, which allows removing from the air circuit the amount of water which has been evaporated from the materials to be dried. By removing this water in liquid water form, the drying air can therefore circulate in a closed circuit.

A multiple product preparation system allows a uniform distribution of the material to be dried on the drying belts and also an increase of the product/air exchange surface in the case of pasty products or products with a maximum particle size of 10 mm.

The drier comprises a material feed device for feeding materials to the first belt which comprises a volumetric extrusion press spanning the entire width of the belt and an extrusion tank suitable for being opened along the entire width of the belt to allow loading materials to be dried without undergoing extrusion.

The extrusion tank can have a semi-cylindrical shape the concavity of which is pointed upwards, and can be made in two parts at least one of which is movable and can be separated from the other by displacement means to allow the non-extruded materials to fall.

The extrusion press can be formed by plates angularly succeeding one another and spanning the entire width of the belt, these plates being radially supported by a shaft coaxial to the extrusion tank, the flexible plates scraping the inner wall of this tank.

Besides the arrangements described above, the invention consists of a specific number of other arrangements which will be explained in more detail below by way of an embodiment described with reference to the attached drawings but in no way limiting.

BRIEF DESCRIPTION OF THE DRAWINGS

In these drawings:

FIG. 1 is a longitudinal section of a drier according to the invention illustrating the positioning of the belts, fans, heat exchangers and handling means for handling the materials to be dried.

FIG. 2 is a diagram illustrating the circulation of air in a drier according to the invention.

FIG. 3 is a larger scale cross-section according to line III-III of FIG. 1.

FIG. 4 is an enlarged detail perspective view of section IV of FIG. 3.

FIG. 5 is a larger scale depiction of a unit of FIG. 1.

FIG. 6 is a smaller scale perspective view of a drier with three sections forming a drying module of FIG. 1.

FIG. 7 is a larger scale vertical cross-section of the device for preparing and distributing the materials to be dried for loading them on the drying belt, in a working position for mainly pasty products the particle size of which is smaller than 10 mm, and FIG. 8 shows, in a manner similar to FIG. 7, the material feed device for feeding materials to be dried in a working position for non-pasty products or products with a particle size larger than 10 mm.

DETAILED DESCRIPTION OF THE INVENTION

Referring to the drawings, specifically to FIGS. 1, 3 and 5, a belt drier 1 for drying pasty and/or powdery materials containing water to be evaporated, particularly for sludges from waste water treatment plants, sludges from methanisation, by-products from industrial processes and others, and biomass can be seen.

The drier comprises a first air permeable conveyor belt 2 on which the materials to be dried are poured to form a first drying path, and at least a second air permeable conveyor belt 3 to assure at least a second drying path for drying the materials after the first path.

According to the illustrated embodiment, the belts 2 and 3 are endless belts wound around rollers with horizontal parallel axes, 2a, 2b and 3a, 3b, respectively, determining the ends of the loops and the reversal of the path of the branches of each loop. The second belt 3 is arranged under the first belt.

A hopper 4 containing the products to be dried is provided above the first belt 2 to assure feeding the materials to be dried by gravity to this belt 2 at one end of the loop, located on the left according to the depiction of FIG. 1. The upper branch 2.1 of the loop moves from left to right according to this figure. At its right end, corresponding to the roller 2b, the belt 2 allows the material to fall on the second belt 3 extending beyond the roller 2b. The belt 3 rotates in a direction opposite to belt 2 and the materials to be dried return to the left of FIG. 1 to be poured into a dried material recovery device 5.a, under the left end of the belt 3. A rotating brush 6.a is provided at each winding end of the belts 2 and 3, upstream from the fall of material to be dried on the belts. The brush 6.a for the belt 2 is therefore at the left end while the brush 6.a for the belt 3 is at the right end.

A grinder 6.b formed by a rotating shaft with transversally located rigid blades is provided at the winding end of the belt 2.b and 3.b to assure the disintegration of possible product slabs created during the drying process on the belt 2 and to aid in pouring the product on the belt 3.

A grinder 6.c formed by a rotating shaft with transversally located rigid blades is provided at the winding end of the belt 2.a and 3.a to assure the disintegration of the possible product slabs created during the drying process in the belt 3 and to aid in feeding the screw 5.a. A device 5.b located under the right part of the belt 3 recovers possible product particles deposited along the floor of the drier which are transported towards the device 5.b for the lower branch 3.2 of the belt 3.

The drier 1 is advantageously a modular drier with identical units or sections 7.1, 7.2, 7.3 juxtaposed between two end modules 8, 9. The module 8 equipped with the hopper 4 surrounds the inlet of the materials to be dried and the outlet of those materials after drying. The module 9 surrounds the ends of the loops around the rollers 2b, 3b.

The drier 1 comprises identical air blowing means 10 for each section 7.1, 7.2, 7.3. Each blowing means 10 comprises a radial fan 11 (FIG. 3) which draws in the air under the second belt 3 as illustrated by the arrows in FIG. 3 to blow it according to the vertical direction, as illustrated by the arrow V, into a free space 12 provided between the support devices of the belts and a wall 13 closing the dryer off from the outside. Each section is generally surrounded by detachable walls, not depicted, for the purpose of making up a relatively closed space for the drying air to circulate in a closed circuit.

The air distribution circuit is provided so that the drying air circulates downwards according to the arrows D (FIG. 3) through the layers of materials to be dried M2, M3 and the belts 2, 3 playing the role of a filter and retaining the powder.

In each section, heating means 14 of the blown air comprising a heat exchanger, exchanger 14 hereafter, is arranged above the first belt 2. This exchanger 14 can be a liquid/air or vapour/air exchanger, specifically a hot water/air exchanger.

The air which has passed through the belt 2 loaded with the materials M2 making up the damper product is reheated by means of a reheating means 15 comprising an exchanger, the exchanger 15 hereafter, before passing through the layer M3 of drier products. The heat exchanger 15 reheats the air before it passes through the layer of materials M3 on the second belt 3. This heat exchanger 15 is advantageously arranged between the branches 2.1 and 2.2 of the belt 2.

This specific arrangement of the interchanger 15 helps the air to follow a straight path, without altering its course, essentially perpendicular to the belts 2, 3 which lead to increase the drier technical features by reducing the generation of suspended powder, allowing in addition a more compact construction which reduces the distance between the belts 2, 3. This reduction of the distances between the belts 2, 3 and the fact that alterations in the course of the drier air are avoided, as said drier air must not to be deviated from its vertical trajectory in order to be forced to pass through the reheating means out of the vertical projection of the belts, the way it happens in the known driers, improves the energy consumption for heating the air, because this reduces the contact of the air with the surroundings in the trajectory towards the belt downstream the reheating means, as well as the energy consumption for the air circulation.

A cooling exchanger 16 is arranged above the exchanger 14 such that part of the air recirculated by each fan 11 passes through it. As illustrated in FIG. 5 the cooling exchanger 16 is arranged such that the air passes through it according to a horizontal direction parallel to the movement direction of the belts 2 and 3. One or several axial fans 17 with a horizontal axis of rotation orthogonal to the axis of rotation of the fan 11 are arranged on one side of the exchanger 16 to control the airflow passing through this exchanger.

The circulation of the drying air is assured by the radial fans 11 located at the ground level of the drier, which send the air towards the upper part of the drier. The speed of the main fans 11 as well as that of the fans 17 is adjustable with the aid of speed variators.

Regulating the speed of the main fans 11 allows assuring one and the same speed of air passage through the belts 2 and 3 and the layers of materials, despite the differences in differential pressure created by different materials to be dried and despite the variation of differential pressure which can be caused by specific products during the drying process. This fan speed regulation allows providing the multiple product drier with an automatic adaptation to different materials and an optimisation of ventilation electric power consumption.

Regulating the speed of the fan 17 allows adjusting the part of recirculated air passing through the cooling exchanger 16. Regulating the speed of this fan further allows cooling the part of air passing through the exchanger 16 to a temperature corresponding to the dew point, which allows removing the amount of water which has been evaporated from materials to be dried, in liquid water form, while at the same time the drying air is circulated in a closed circuit. The water which has been condensed in the course of the cooling exchanger 16 is drained by means of a conduit not shown in the drawings.

The closed circuit followed by the recirculated air in the drier comprises a vertical branch corresponding to the arrow V (FIG. 3), the mid-plane of the vertical flow being perpendicular to the axis of rotation of the fan 11, and parallel to the forward movement direction of the belts 2 and 3. In the top part of the drier section, the airflow is divided into two downward branches, represented by the arrows 18, 19 in FIG. 5. As part of the downward flow according to the arrow 18 passes in front of the cooling exchanger 16, it is drawn in according to the direction of the horizontal arrows 20 through the exchanger 16 by the fan 17 which expels the drawn in air according to the downward direction 19. The flow according to the horizontal arrows 20 is considerably parallel to the movement direction of the belts 2 and 3.

The downward airflow according to the arrows 18, 19 then passes through the heat exchanger 14, it then passes through the first layer of materials M2 on the belt 2 according to the direction of the vertical downward arrows D (FIG. 3), then the reheating exchanger 15, then the second layer of materials M3 and the second belt 3 to be drawn in by the fan 11 according to the direction of the horizontal arrow 21 (FIG. 3) orthogonal to the movement direction of the belts.

The drier according to the invention makes up belt equipment for thermal drying by means of air convection which allows treating different types of pasty and/or powdery materials, specifically sludges from urban or industrial waste water treatment plants, sludges from methanisation, by-products from industrial processes and others, and biomass, as a result of a multiple product preparation system comprising a feed device 22 to feed to the first belt 2 assuring a uniform distribution of the material to be dried on the belt 2, and also an increase of the product/air exchange surface in the case of pasty products or products with a particle size smaller than 10 mm.

The feed device 22, depicted on a larger scale in FIG. 7, comprises a volumetric extrusion press 23 spanning the entire width of the belt 2 and an extrusion tank 24.

The extrusion press 23 is formed by flexible plates or blades 25 oriented in a considerably radial manner, displaced angularly and extending parallel to the width of the belt 2. These plates 25 are fixed, according to a longitudinal edge, to one end in a rotating shaft 26 parallel to the width of the belt 2. The tank 24 is considerably semi-cylindrical coaxial to the shaft 26. When this shaft 26 rotates, the plates 25 scrape the inner surface of the tank 24. According to the depiction of FIGS. 1, 7 and 8, the shaft 26 rotates clockwise. The plates 25 rotate under the outlet of the hopper 4 and entrain into the tank 24 a volume determined by the space comprised between two plates and the inner surface of the tank. The outlet of the hopper 4 is generally equipped with a rotational driving device 4a (FIG. 1) to facilitate the exit of the materials towards the tank.

The inner wall of the tank is made up of a grating 27 having perforations or orifices through which the material is extruded under the effect of the pressure exerted by the rotating plates 25. There are advantageously four plates 25 and they succeed one another at right angles, the concavity of the tank 24 being pointed upwards.

The wall of the tank 24 is made in two parts 24a, 24b articulated at their outer upper end respectively on a pin 28a, 28b parallel to the shaft 26. The pivoting of each part 24a, 24b in the sense of opening of the tank 24 downwards is assured by a cylinder 29a, 29b an end of which is articulated on a fixed point of the structure of the drier and the other end of which is articulated on a support integral to the part 24a, 24b and protrudes outwards.

As illustrated in FIG. 8, it is therefore possible to open the tank 24 downwards, for example by pivoting the part 24a clockwise around the pin 28a to free an opening 24 through which the material can fall directly on the belt 2 without undergoing extrusion.

This feed method can be used for non-pasty or powdery materials the particle size of which will be larger than, for example, 10 mm and cannot be extruded by the device 23.

The feed device 22 makes up a multiple product distribution and preparation system suitable for pasty products the particle size of which can be smaller or larger than that usually provided for the extrusion press 23.

The grating 27, also made in two parts corresponding to parts 24a, 24b, advantageously has 6-10 mm perforations for extrusion. In the configuration according to FIG. 7, the extrusion press 23 allows extruding sludges or other pasty products having a particle size smaller than the size of the grating perforations generating filaments which are deposited on the drying belt 2 by gravity. In the configuration of FIG. 8, the extrusion press 23 allows distributing fewer pasty products or products having a particle size larger than the size of the grating perforations of the extrusion press on the belt 2.

Quality control on the product poured on the belt 2 is assured by means of controlling the adjustable rotation speed of the shaft 26 and of the plates or blades 25. These plates 25 assure a volumetric control of the product which passes through the extrusion press, in relation to controlling the product loading height on the upper belt 2.

The feed device 22 has a width equivalent to that of the belt 2 and allows uniform distribution of the product. The hopper 4 allows having a uniform product weight on standby to regulate the product load pressure during its passage towards the belt 2.

It is worth mentioning that the advantages provided by this feed device 22 can be used in other drier embodiments, albeit said device does not have reheating means between the branches of the first belt. Thus, feed device 22 is compatible with other embodiments of a drier not encompassed in the present invention.

The drying air circuit is formed with air the maximum temperature of which is preferably 85° C.

The drier 1 is made by means of assembling the sections 7.1, 7.2, 7.3 in threes in the depicted example, this number can be different, and can reach specifically seven. The grouping of one to seven sections forms a drying module. The dimensions of the modules have been optimised to take transport limitations into account. The desired capacity of the drier 1 is obtained by means of assembling several drying modules, specifically from one to five modules, with continuity of the belts 2, 3 passing through the different modules. Both the section and belt width can vary depending on the desired capacity.

The walls covering the drier to make up a closed space from the entrance of the materials to be dried until their exit are made in the form of detachable panels fixed to the structure of the drier. This structure is made in the form of a rectangular parallelepiped with sections assembled as illustrated in FIG. 6 with thermal point breaks.

The diagram of FIG. 2 summarises the drier operation. The drying air is blown by the fan 11 towards the heat exchanger 14. A part of this air is diverted to pass through the condensation exchanger 16 under the suction effect of the fan 17. After having unloaded a specific amount of humidity therefrom, this part is reintroduced into the airflow directed towards the exchanger 14. The air heated by this exchanger passes through the layer of materials M2 supported by the belt 2, as well as this belt, to later be reheated by the exchanger 15 and to pass through the layer of materials M3 and the belt 3. The air which has passed through the belt 3 is sent back to be drawn in by the fan 11.

A drier according to the invention allows treating different types of products while at the same time assuring one and the same speed of air passage through the belts and the layers of materials to be treated by means of regulating the speed variators controlling the fans 11.

The circulation of air in the downward direction and in the direction transverse to the forward movement of the belts allows reducing powder generation, without impairing the level of drying as a result of reheating the air which has passed through the belt 2 loaded with the damper product.

Cooling part of the air to a dew point allows removing the amount of water which has been evaporated, with circulation of the drying air in a closed circuit.

The drier allows obtaining a product at the outlet the dryness of which can be adjusted and in the order of 90%.

Many applications are possible, not only for sludges, but also for biomass, or for wood chips or the like which are subjected to energy recovery or gasification treatment at the outlet of the drier providing gas used in cogeneration to produce electricity; this gasification generates waste in the form of ash.

The invention claimed is:

1. A multiple product belt drier for drying pasty and/or powdery materials containing water to be evaporated, comprising:
   a first air permeable conveyor belt on which the materials to be dried are poured to form a first drying path,
   at least a second air permeable conveyor belt, arranged below the first conveyor belt, to assure at least a second drying path for drying the materials after the first one,
   air blowing means,
   air heating means for heating the blown air to dry the materials, and
   a drying air distribution circuit for distributing the drying air towards the materials and the belts,
   wherein the drying air circuit is provided so that the drying air circulates downwards through the materials to be dried and the belts, according to a direction considerably perpendicular to the belts, and air reheating means are provided in the drier between the two paths to reheat the air which has passed through a layer of the materials on the first belt, before the air passes through a layer of the materials on the second belt, and wherein the belts are endless belts wound around rollers with horizontal parallel axes and defining an endless loop, each endless loop having an upper branch and a lower branch, the reheating means being arranged between the branches of the first belt;
   wherein the air heating means are located above the first belt, and an air cooling exchanger for cooling air which has passed through the second belt is arranged above the heating means so that part of the recirculated air passes through the air cooling exchanger, and to assure condensation of part of the evaporated water, and wherein a radial fan adjustable in speed and with a horizontal axis of rotation is arranged on one side of the air cooling exchanger to control the airflow passing through the air cooling exchanger; and
   wherein the air blowing means is located at a ground level of the drier.

2. The drier according to claim 1, wherein the blowing means are adjustable according to the nature of the materials to be dried to control the head loss in the course.

3. The drier according to claim 1, wherein the blowing means comprise at least one radial fan driven by an adjustable speed motor.

4. The drier according to claim 1, wherein the material feed device for feeding materials to the first belt comprises a volumetric extrusion press spanning an entire width of the belt and an extrusion tank suitable for being opened along the entire width of the belt to allow loading materials to be dried without undergoing extrusion.

5. The drier according to claim 4, wherein the extrusion tank has a semi-cylindrical shape a concavity of which is pointed upwards, and is made in two parts at least one of which is movable and can be separated from the other by displacement means to allow the non-extruded materials to fall.

6. The drier according to claim 4, wherein the extrusion press is formed by plates angularly succeeding one another and spanning the entire width of the belt, these plates being radially supported by a shaft coaxial to the extrusion tank, the plates scraping the inner wall of the tank.

7. The drier according to claim 1, comprises a grinding systems that assure the disintegration of the possible product slabs created during the drying process.

8. The drier according to claim 1, wherein the lower branch of the belt at ground level assures recovering any particle deposited on the floor of the drier, which is extracted from the drier by means of a screw type device.

9. The drier according to claim 1, wherein the pasty and/or powdery materials containing water is at least one of sludge from waste water treatment plants or sludge from methanisation, biomass.

10. The drier according to claim 1, wherein the flow of air through the cooling exchanger is perpendicular to the flow of air through the air heating means.

11. A multiple product belt drier for drying pasty and/or powdery materials containing water to be evaporated, comprising:
a first air permeable conveyor belt on which the materials to be dried are poured to form a first drying path,
at least a second air permeable conveyor belt, arranged below the first conveyor belt, to assure at least a second drying path for drying the materials after the first drying path,
an air blower,
an air heater for heating the blown air to dry the materials, and
a drying air distribution circuit for distributing the drying air towards the materials and the belts,
wherein the drying air circuit is provided so that the drying air circulates downwards through the materials to be dried and the belts, according to a direction considerably perpendicular to the belts, and an air reheater is provided in the drier between the first drying path and the second drying path to reheat the air which has passed through a layer of the materials on the first belt, before the air passes through a layer of the materials on the second belt, and wherein the belts are endless belts wound around rollers with horizontal parallel axes, each endless belt having an upper branch and a lower branch, the air reheater is arranged between the upper branch and the low branch of the first belt; and
wherein the material feed device for feeding materials to the first belt comprises a volumetric extrusion press spanning an entire width of the belt and an extrusion tank suitable for being opened along the entire width of the belt to allow loading materials to be dried without undergoing extrusion.

12. The drier according to claim 11, wherein the extrusion tank has a semi-cylindrical shape a concavity of which is pointed upwards, and is made in two parts, at least one of which is movable and can be separated from the other to allow the non-extruded materials to fall.

13. The drier according to claim 11, wherein the extrusion press is formed by plates angularly succeeding one another and spanning the entire width of the belt, the plates being radially supported by a shaft coaxial to the extrusion tank, the plates scraping the inner wall of the tank.

14. The drier according to claim 11, wherein the air heating means are located above the first belt, and an air cooling exchanger for cooling the air which has passed through the second belt is arranged above the heating means so that part of the recirculated air pass through the air cooling exchanger, and to assure condensation of part of the evaporated water.

15. The drier according to claim 11, wherein a radial fan with a horizontal axis of rotation is arranged on one side of the air cooling exchanger to control the airflow passing through the air cooling exchanger.

16. The drier according to claim 11, wherein the material feed device for feeding materials to the first belt comprises a volumetric extrusion press spanning an entire width of the belt and an extrusion tank suitable for being opened along the entire width of the belt to allow loading materials to be dried without undergoing extrusion.

17. The drier according to claim 11, comprises a grinding systems that assure the disintegration of the possible product slabs created during the drying process.

18. The drier according to claim 11, wherein the lower branch of the belt at ground level assures recovering any particle deposited on the floor of the drier, which is extracted from the drier by means of a screw type device.

* * * * *